Dec. 7, 1954   F. MAYER   2,696,060
FISH LURE WITH EXPANDING HOOKS
Filed Aug. 27, 1953
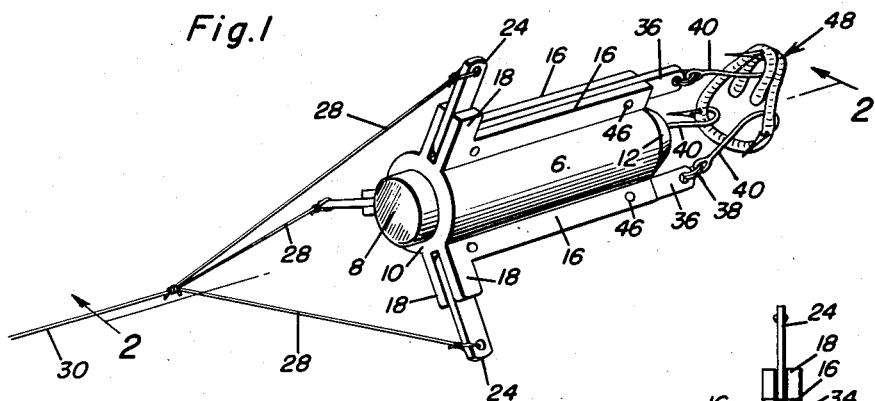
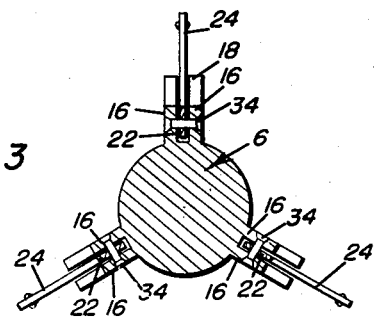
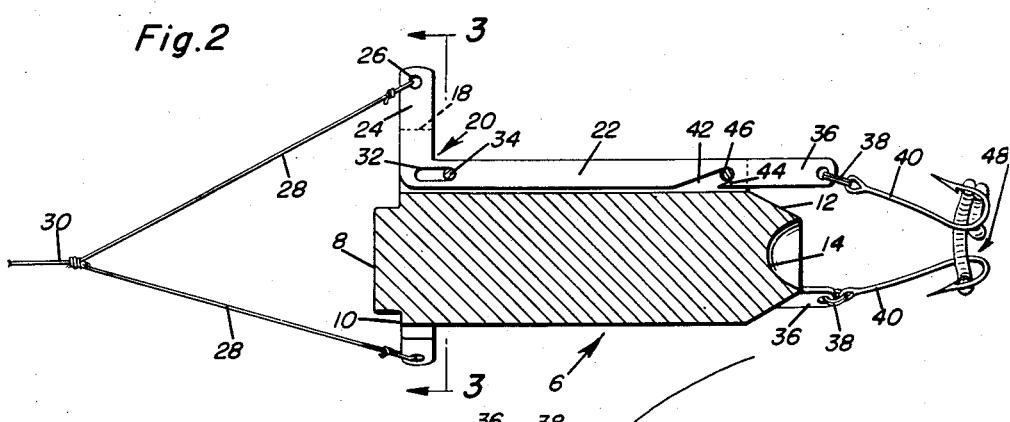
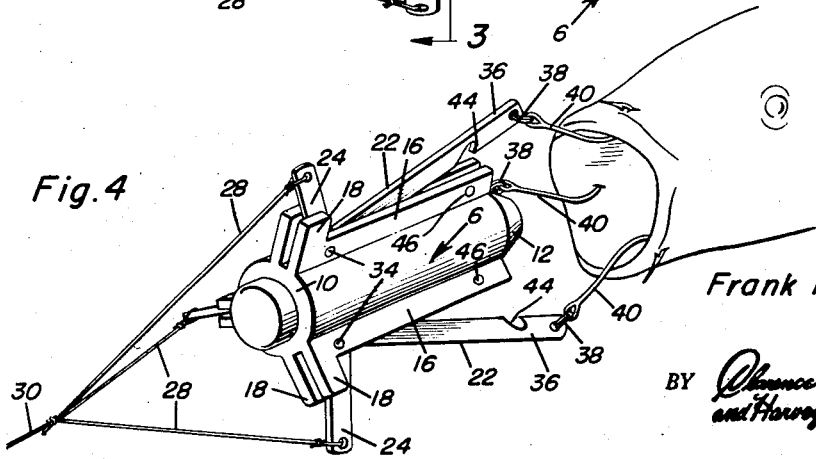
Frank Mayer
INVENTOR.

United States Patent Office 2,696,060
Patented Dec. 7, 1954

2,696,060

FISH LURE WITH EXPANDING HOOKS

Frank Mayer, Mount Vernon, Ohio

Application August 27, 1953, Serial No. 376,823

5 Claims. (Cl. 43—35)

The present invention relates to an artificial fishing lure which is characterized by a plug constructed in the general form of a minnow and a plurality of openable and closable fishing hooks operatively mounted on the cooperating surfaces of the plug through the medium of pull-actuated expanding arms.

An object of the invention is to provide a construction having the stated structural characteristics and wherein the arms are positively held in their retracted set positions through the medium of positive means which allows the over-all bait to be cast out into the stream, no springs or intricate mechanisms being utilized, whereby to thus provide a simple and reliable ready-to-function lure.

Another object of the invention has to do with a lure characterized by a plug having the aforementioned expanding arms, the latter being arranged at equi-distant circumferentially spaced points around the forward surface portions of the plug, the fishhooks being at the trailing end beyond said trailing end and so arranged and associated with the adjacent swingable free ends of the arms that they may be interconnected, when the bait is set for casting, by artificial bait, a wad of dough, for example, or a live bait, such as a worm, said bait serving to maintain the several cooperating hooks in their desired set positions until the bait is taken by the victim and the necessary pull thus exerted on the hooks for purposes of releasing the arms and permitting the latter to fly out to expanded positions relative to the plug.

Briefly summarized, a preferred embodiment of the invention comprises a plug of suitable size and shape and at least one arm hingedly mounted at one end on the corresponding end of the plug, means for connecting the fishing line to said hingedly mounted end, a fishhook connected to the adjacent end of the arm, and pull-released means retaining the entire arm in its set but ready-to-operate position on the surface of the plug, said means being characterized by a keeper hook and a keeper pin, and said arm being preferably slidable and generally L-shaped in side elevation.

More explicitly analyzed, the invention comprises a plug which is shaped in imitation of a desired form of a minnow, said plug having an axial water-trapping pocket at one end, preferably the trailing end, and being provided in at least one side with lengthwise groove means, at least one substantially L-shaped arm embodying a long arm normally retracted and wholly seated within said groove means, means releasably securing the intermediate portion of the long arm in said groove means, a pin and slot connection slidably and pivotally joining the arm with the body at the juncture of the long and short arms, whereby to provide an arrangement wherein a fishhook is joined to the free end of the long arm and a fishing line may be joined to the free end of the short arm.

Other objects, features and advantages will become more readily apparent from the following description and the accompanying sheet of illustrative drawings.

In the drawings, wherein like numerals are employed to designate like parts throughout the views:

Figure 1 is a perspective view of a lure constructed in accordance with the principles of the present invention and showing the same as set and ready for casting;

Figure 2 is an enlarged view with parts in section and elevation, said view being taken approximately on the plane of the longitudinal line 2—2 of Figure 1, looking in the direction of the arrows;

Figure 3 is a cross-section on the line 3—3 of Figure 2, looking in the direction of the arrows; and Figure 4 is a perspective view based on Figure 1, and showing the same particulars in the same relationship with the fishhooks lodged in the mouth of the fish and the arms in their expanded or spread positions.

Reference is had to the drawings with the aid of reference numerals and accompanying lead lines designating the individual components. The aforementioned plug, which may be of suitable material and which may be sufficiently heavy to serve as a sinker, is denoted by the numeral 6. It is here shown as elongate and generally cylindrical in cross-section. The forward end has a reduced circular protrusion 8 defining an encircling surface or shoulder 10. At the rear ends, there is a tapered extension 12 having a substantially semi-spherical cavity 14 formed therein. This cavity is a water-trapping pocket, and its purpose is to assist in holding the plug in a position relatively stationary to the sliding and expanding pull-actuated fishhooks. The lengthwise surface of the plug is provided with suitable groove means, generally speaking. Actually, the grooves are defined by way of pairs of spaced parallel outstanding lengthwise flanges. These flanges are properly integrated with the surface of the plug, and they are denoted by the numerals 16—16. They are duplicate, and have outstanding lateral end portions 18 at what may be called the leading end of the lure or plug. Of course, it would be within the purview of the invention to form actual channels or grooves in the surface of the plug. The construction shown is preferred. This groove means serves to accommodate the several extendible and retractable arms. While the arms may be of other construction, they are L-shaped in form. The description of one will suffice, it is believed, for all. Each L-shaped arm in Figure 2 is therefore designated by the numeral 20, and it comprises a long arm 22 of a length greater than the length of the groove in which it is normally seated, and a short arm 24. The short arm is provided with a hole 26 to accommodate a flexible element 28 which is joined with the fishing line 30. At the juncture of the long and short arms, there is a slot 32 which is horizontally disposed and through which passes an attaching pin 34. This pin and slot connection permits the desired hinging and sliding movement of the over-all arm 20 relative to the plug. The rear or trailing end of the arm extends beyond the corresponding end of the plug, as denoted at 36, where it is provided with a ring 38 to which the complemental fishhook 40 is connected. The intermediate portion of the arm has a diagonal notch 42 formed therein which defines a keeper hook 44 releasably engaging the fixed keeper pin 46 mounted between the coacting channel or groove-forming flanges. When the device is set, the keeper hook 44 is, of course, engaged with the keeper pin 46 in the manner shown in Figures 1, 2 and 3. In order to maintain the parts in this association, the hooks are baited as denoted generally by the numeral 48. Here, a live worm is shown secured to the hooks and keeping the hooks in their contracted relationship. If desired, a ball of dough or equivalent bait may be used for linking the several hooks together. In any event, the device is set for use in the manner shown in Figures 1, 2 and 3.

When the bait is taken in the fish's mouth, the hooks are engaged and lodged in the mouth, and the pull on the hooks tends to slide the slots 32 on the pins 34 and to thus release the keeper hooks from the keeper pins. Then, the relative movement of the line-controlled plug and the crank action of the L-shaped arms causes the arms to expand in the manner shown, and consequently, the fish is securely hooked.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A pull-actuated artificial bait construction comprising a plug, at least one substantially L-shaped arm embodying a long arm and a lateral short arm connected to one end of said long arm, said long arm having an elongate slot adjacent to its junctural connection with said short arm, a pivot pin fixedly secured to said plug and passing through said slot and providing a sliding and hinging connection between said long arm and plug, the other end of said long arm being free and capable of swinging toward and from said plug, means releasably connecting the intermediate portion of said long arm with said plug, a fish hook attached to the free end of said long arm, and a fishing line attached to said short arm.

2. The structure defined in claim 1, wherein said releasable connecting means comprises a keeper pin fixed on said plug and a keeper hook on said long arm releasably engaging said keeper pin.

3. The structure defined in claim 1, wherein said plug has a water-trapping cavity in its extreme trailing end.

4. A pull-actuated artificial bait construction comprising, in combination, an elongated plug generally cylindrical in cross-section and provided in its trailing end with an axial water-trapping pocket and provided on at least one side with a lengthwise groove, a substantially L-shaped arm embodying a long arm and a short arm, said long arm normally retracted and being seated within said groove, means releasably securing an intermediate portion of said long arm in said groove, a pin and slot pivoting and sliding connection between one end portion of said long arm and said plug, a fishhook joined to the opposite end portion of said long arm, and a fishing line joined to said short arm.

5. A pull-actuated artificial bait construction comprising an elongated plug which is substantially cylindrical in cross-section and provided at its trailing end with a concave axially disposed water-trapping pocket, a plurality of pairs of lengthwise flanges joined with the exterior surface of said plug, each pair of flanges forming an open-ended groove, a fixed pivot pin mounted in each pair of flanges adjacent to the forward end of the plug, a fixed keeper pin mounted in each pair of flanges adjacent to the rearward end of said plug, a substantially L-shaped arm in each of said grooves having a long arm and a short arm, said long arm being provided intermediate its ends with a notch defining a keeper hook releasably engaging the corresponding keeper pin, said long arm being provided at its juncture with the short arm with an elongated slot slidably and hingedly attached to the corresponding pivot pin, a fishhook connected at one end to the adjacent end of the long arm, a fishing line, and a flexible connection between the fishing line and the adjacent end of said short arm.

References Cited in the file of this patent

UNITED STATES PATENTS

| Number | Name | Date |
|--------|------|------|
| 394,632 | Wood | Dec. 18, 1888 |
| 1,812,906 | Swearingen | July 7, 1931 |